United States Patent
Contrucci et al.

(10) Patent No.: US 6,391,086 B1
(45) Date of Patent: May 21, 2002

(54) METHOD FOR THE USE OF ELECTRIC STEEL PLANT SLAG FOR SELF-REDUCING AGGLOMERATES

(75) Inventors: Marcos de Albuquerque Contrucci, Rio de Janeiro; Edmar Saul Marcheze, Santa Catarina, both of (BR)

(73) Assignee: Northstar Steel Co., Edina, MN (US)

( * ) Notice: Subject to any disclaimer, the term of this patent is extended or adjusted under 35 U.S.C. 154(b) by 0 days.

(21) Appl. No.: 09/811,411

(22) Filed: Mar. 20, 2001

(51) Int. Cl.⁷ .............................. C22B 1/16; C22B 7/04
(52) U.S. Cl. ................................ 75/319; 75/569; 65/19
(58) Field of Search ..................... 75/319, 569; 65/19

(56) References Cited

U.S. PATENT DOCUMENTS 4,168,966 A * 9/1979 Furui et al. ................... 75/322
4,636,342 A * 1/1987 Miyashita et al. ............. 264/82
4,936,908 A * 6/1990 Takahashi et al. ............ 75/501
6,179,895 B1 * 1/2001 Barker ......................... 75/303

* cited by examiner

*Primary Examiner*—Roy King
*Assistant Examiner*—Tima McGuthry-Banks
(74) *Attorney, Agent, or Firm*—Finnegan, Henderson, Farabow, Garrett & Dunner L.L.P.

(57) ABSTRACT

The present invention refers to a method for using electric steel plant slag, ground and/or in particles of less than 6 mm, in self-reducing agglomerates, in the form of pellets or briquettes, as a fluxing material and as a secondary source of iron, in sufficient amounts to adjust the binary basicity of the final slag (ratio of $CaO/SiO_2$) of the reduction/melting process to values equal or greater than 1.1. This application enables a reject that is difficult to discard to be transformed into a secondary source of iron and a final slag having adequate characteristics to be used in the concrete and asphalt paving industries.

10 Claims, No Drawings

METHOD FOR THE USE OF ELECTRIC STEEL PLANT SLAG FOR SELF-REDUCING AGGLOMERATES

BACKGROUND OF THE INVENTION

The present invention relates to a self-reducing agglomerate that includes slag from electric furnace steel production. It further relates to a method for using this slag as a fluxing agent introduced to slag resulting from a refining process using the agglomerates in the production of iron.

It is known to produce steel by refining in an electric furnace. In this practice, an electrode is positioned above the bath or charge within the furnace. An arc is generated between the electrode and the bath or charge to provide the heat necessary for the fining operation. Slag resulting from this operation is inherently rich in iron content. This prevents its use in the production of concrete and asphault, which are common sources for disposal of other steelmaking slags, such as those resulting from oxygen steelmaking operations.

Consequently, electric furnace steelmaking slag is normally discarded in industrial waste sites at relative high cost and no return benefit.

SUMMARY OF THE INVENTION

In accordance with the invention, there is provided a self-reducing agglomerate for use in a refining operation for the production of molten iron. This agglomerate comprises a particle mixture of an iron oxide containing material, a reductant, and a fluxing agent. The iron oxide containing material includes about 5 to 30% of slag from electric furnace steel production.

Preferably, the slag is present in an amount of about 8 to 20%.

Preferably, the slag has a maximum particle size of about 6 mm for briquettes and 1 mm for pellets.

In accordance with an additional practice of the invention, the agglomerates may be used in a refining process for producing iron wherein slag from electric furnace steel production is introduced to the slag resulting from the refining process to act as a fluxing agent for nonmetallics present in the self-reducing agglomerates.

The slag may be present in the agglomerates in an amount sufficient to adjust the binary bacicity of the slag resulting from the refining process to a value of about 1.1 minimum and about 1.5 maximum.

The invention uses steel plant slag evenly distributed in the mixture to be agglomerated, which may be in the form of pellets and in the form of briquettes or other geometric shapes acceptable for the agglomeration process and the subsequent refining process.

The agglomerate is comprised of fines of iron ore and/or industrial residue containing iron oxides and/or metallic iron, fines of carbonaceous materials in sufficient amounts to reduce all the oxidized metals being present, fluxing materials, binders and humidity forming a homogenous mixture of all the components.

Preferably in the method according to the invention, the mixture of the agglomerate is comprised by self-reducing agglomerates formed in pellets, briquettes or another geometric shape adequate for the process of agglomeration and of reducing/melting.

In the present invention, the electric steel plant slag may be employed as a secondary source of iron and as a fluxing material for the nonmetallic impurities of the other components of the agglomerate and to adjust the binary basicity of the final slag, resulting from the process of reducing/melting of the agglomerate, to a value equal to 1.1 or above, that is, the ratio $CaO/SiO_2=1.1$.

As a source of iron, the steel plant slag allows a decrease in the use of conventional iron sources, proportionally to the iron contents thereof in the necessary amount as fluxing material and to adjust the basicity of the final slag.

As a fluxing material, the steel plant slag replaces materials such as lime, limestone, cement and similar materials, by providing the same technical performance and, in addition, great economic advantage, because it is an industrial waste that is rich in calcium, the main component required in fluxing materials. For this application there are employed contents from 5 to 30% in the mixture to be agglomerated.

DETAILED DESCRIPTION OF THE PREFERRED EMBODIMENTS

Table 1 shows a typical composition of electric steel plant slag, including the total iron contents, the contents of calcium oxide and magnesium oxide. These are the main components allowing this slag to be used in self-reducing agglomerates. The iron is a low-cost source of this metal, the CaO is useful for adjusting the basicity of the final slag and the MgO is useful as a modifier of the viscosity of the final slag.

| Typical Composition of Electric Steel Plant Slag | | |
|---|---|---|
| Components | % | % |
| $Fe_2O_3$ | 18.53 | |
| FeO | 13.13 | |
| Metallic Fe | 2.12 | |
| Total Iron | | 25.30 |
| $SiO_2$ | 12.58 | |
| CaO | 36.60 | 36.60 |
| MgO | 7.92 | 7.92 |
| $Al_2O_3$ | 3.91 | |
| ZnO | 0.011 | |
| PbO | 0.027 | |
| $P_2O_5$ | 0.872 | |
| Balance | 5.172 | |
| Total | 100.000 | |

There is known the use of agglomerates that employ the mechanism of hydraulic cure in time, both using cement per se reacting with water, and cements formed in situ by mixing materials such as lime, blast furnace slag and silica, there being possible to replace a part or all these materials with electric steel plant slag.

In accordance with the invention, green agglomerates in the form of briquettes were produced from a mixture of iron oxide containing material constituting iron ore fines, a reductant constituting petroleum coke and slag from electric furnace steel production with pre-gel as a binder. The green agglomerates were cured by heating for the time at a temperature set forth in Table 1. Upon completion of curing the briquettes were tested to determine the cold compression strength thereof by determining the compression required for fracture.

TABLE 1

| Date | Briquette Dimensions mm | Curing Temp. °C. | Curing Time minutes | Pre-gel % | Slag % | Cold Compression Strength kgf/briquette | Specified Cold Compression Strength kgf/briquette |
|---|---|---|---|---|---|---|---|
| 06/12/00 | | | | 1.0 | 5.5 | 75–95 | |
| | | | | 1.5 | 5.5 | 112–120 | |
| | 50 × 30 × 20 | 140 | 30 | 1.0 | 6.5 | 85–100 | >80 |
| | | | | 1.5 | 6.5 | 92–105 | |
| | | | | 1.0 | 8.0 | 110 | |
| | | | | 1.5 | 8.0 | 189 | | kgf means kilograms of force.

According to the present invention, the electric steel plant slag, having been ground and/or in particles having 6 mm of less is added and distributed in homogenous fashion in the self-reducing mixture to be agglomerated as pellets or briquettes, in a proportion of about 5 to about 30%, more specifically from about 8 to about 20%, in order to adjust the binary basicity (ratio $CaO/SiO_2$) of the slag to a value of=1.1, more specifically to a value of=1.2.

What is claimed is:

1. A self-reducing agglomerate for use in a refining operation for the production of molten iron comprising, a particle mixture of an iron oxide containing material, a reductant, and slag from electric furnace steel production to provide a fluxing agent and also an additional source of iron.

2. The agglomerate of claim 1, wherein said slag is present in an amount of about 8 to 20 wt. %.

3. The agglomerate of claim 1 or claim 2, wherein said slag has a maximum particle size of about 6 mm for briquettes and 1 mm for pellets.

4. A refining process for the production of molten iron, said process comprising refining self-reducing agglomerates to produce iron therefrom, said agglomerates comprising a particle mixture of an iron oxide containing material, a reductant, and slag from electric furnace steel production to provide a fluxing agent and also an additional source of iron.

5. The process of claim 4, wherein said slag in said agglomerates is present in an amount of about 8 to 20 wt. %.

6. The process of claim 4 or claim 5, wherein said slag in said agglomerates has a maximum particle size of about 6 microns.

7. The process of claim 4 and claim 5, wherein said slag in said agglomerates adjusts binary basicity of said slag resulting from said refining process to a value of about 1.1 minimum.

8. The process of claim 7, wherein said slag in said agglomerates is present in an amount of about 8 to 20 wt. %.

9. The process of claim 4 or claim 5, wherein said slag in said agglomerates adjusts binary basicity of said slag resulting from said refining process to a value of about 1.5 maximum.

10. The process of claim 9, wherein said slag in said agglomerates is present in an amount of about 8 to 20 wt. %.

* * * * *